United States Patent
Wong

(10) Patent No.: US 6,889,968 B1
(45) Date of Patent: May 10, 2005

(54) INSERTA CLAMP

(75) Inventor: Harry Wong, South Pasadena, CA (US)

(73) Assignee: Valtra, Inc., Pico Rivera, CA (US)

( * ) Notice: Subject to any disclaimer, the term of this patent is extended or adjusted under 35 U.S.C. 154(b) by 0 days.

(21) Appl. No.: 10/449,889

(22) Filed: Jun. 2, 2003

(51) Int. Cl.$^7$ ................................................. B23Q 3/02
(52) U.S. Cl. .............................. 269/91; 269/71; 269/95; 269/101; 29/270
(58) Field of Search .............................. 269/91–94, 71, 269/99, 101, 900, 305, 315, 249, 143; 29/270

(56) References Cited

U.S. PATENT DOCUMENTS

| | | |
|---|---|---|
| 737,527 A | 8/1903 | Teilborg |
| 2,610,661 A | 9/1952 | Romine |
| 2,642,905 A | 6/1953 | Hewat |
| 3,403,901 A | 10/1968 | Servadio |
| 3,697,046 A * | 10/1972 | Sur ............................ 254/111 |
| 3,934,316 A | 1/1976 | Driscoll |
| 4,134,578 A | 1/1979 | Stanley |
| 4,363,475 A | 12/1982 | McCarty |
| 4,867,427 A | 9/1989 | Cunningham |
| 4,962,918 A | 10/1990 | Yang |
| 5,135,209 A | 8/1992 | Penny |
| 5,187,877 A | 2/1993 | Jory et al. |
| 5,190,271 A * | 3/1993 | Otterbein, II ................ 269/91 |
| 5,482,263 A | 1/1996 | Kutzleb |
| 5,697,601 A | 12/1997 | Gurule |
| 5,718,419 A | 2/1998 | Hall |
| 5,893,553 A | 4/1999 | Pinkous |
| 5,992,836 A | 11/1999 | Howe |
| 6,609,706 B2 * | 8/2003 | Shibata ........................ 269/91 |

* cited by examiner

Primary Examiner—Lee D. Wilson

(57) ABSTRACT

The present invention relates to a general purpose clamping device. It comprises a straight shank with the lower end attached to a short cylindrical sleeve and a movable arm sliding over the shank. Feeding through the free end of the movable arm is a threaded rod with clamping pad and turning handle at the lower end and upper end respectively. The present invention is designed to hold a workpiece tightly, quickly and conveniently on the working surface of a table, workbench or machine tool. And the invention can be relocated easily over the workbench made of wood or metal, or over the working surface of a machine tool. Attachments are provided to enhance the functionality of the invention. A Y-axis attachment assembly is adapted to being slidably mounted on the straight shank to hold a second workpiece along an axis that is generally perpendicular to the vertical clamping direction of the multi-function clamp.

8 Claims, 4 Drawing Sheets

INSERTA CLAMP

BACKGROUND OF THE INVENTION

1. Field of the Invention

The present invention relates to a general purpose clamping device and more particularly to a multi-function clamp. The invention is designed to hold a workpiece tightly, quickly and conveniently on the working surface of a table, a workbench, or a machine tool. Yet the invention can be relocated easily for different configurations and can be removed without trouble after the work is finished. The working surface of the table or workbench can be made of wood or metal, whereas the working surface of a machine tool is a metal surface with or without tooling holes.

The present invention comprises a straight shank with the lower end attached to a short cylindrical sleeve and a movable arm sliding over the shank. Feeding through the free end of the movable arm is a threaded rod with a clamping pad at the lower end and a turning handle at the upper end. Attachments of various designs, including a cylindrical mounting base, or a Y-axis attachment are provided to enhance the functionality and flexibility of the present invention. A quick release button is provided at the upper end of the straight shank to enable the easy insertion and easy removal of the movable arm or the Y-axis attachment to or from the shank. The clamping pad is designed so that it can be rotated freely and swiveled through a limited angle.

To clamp a workpiece on the working surface of a machine tool with tooling holes, the present invention is inserted with the short cylindrical sleeve into one of the tooling holes on the working surface. For those working surfaces without tooling holes, the present invention is inserted into the cylindrical mounting base, which is mounted on the working surface with screws. The same method can be used for wooden workbenchs too. For application on other metal working surfaces, a short cylindrical metal tube with the right diameter can be spot welded on the working surface for the insertion of the cylindrical sleeve at the lower end of the straight shank. When inserted onto the shank of the present invention, the Y-axis attachment can be used for two-dimensional (X and Y axes) clamping of two or more workpieces simultaneously. With these attachments, the functionality and flexibility of the present invention is greatly enhanced.

2. Description of the Related Art

In the fields of bonding, welding and machining, clamps are used for holding workpieces together or holding a workpiece on a workbench. Various types of clamps are available, such as bar clamps, C-clamps, F-clamps and screw clamps. These clamps generally comprise a fixed arm with a fixed clamping pad and a movable arm with a clamping pad, or a fixed arm with a fixed clamping pad at one end and a movable clamping pad attached directly to the other end of the fixed arm. Bar clamp utilizes clamps utilize a sliding arm over the fixed arm to clamp a workpiece. Different types of quick locking and quick releasing mechanisms for the sliding arm are available in the field. A C-clamp consists of a C-shaped fixed arm with a clamping pad at one end and a threaded rod at the other end, which threaded rod has a clamping pad at one end and a cranking handle at the other end. The movable arm of an F-clamp is a straight arm with one end sliding over the L-shape fixed arm and the other end feeding a threaded rod with clamping pad. A screw clamp utilizes two parallel clamping arms opened and closed by two parallel screws. To clamp a workpiece to the surface of a workbench, these conventional clamps must be used at the edge of the workbench so that one of the clamping arms will cross over the edge and reach the bottom of the working surface of the bench. For a small workpiece on a small workbench, this characteristic does not affect the effectiveness of these clamps. However, when the workpiece and the workbench are relatively large, the middle part of the workpiece will be out of the reach of the clamping arms and clamping pads. To overcome this problem, one has to make use of clamping bars, beams or any suitable fixture to hold these conventional clamps over the middle part of the workpiece so that clamping pressure can be applied on the workpiece. This is a logical way to solve the problem, but it is also a very time consuming and inconvenient way to get the job done. Better ways of solving this problem had been devised in the past. For example, U.S. Pat. No. 2,764,195 Adjustably Mounted Bench Clamp by W. Heimes, utilizes an L-shaped clamp beam inserted into a circular face plate and a sleeve. The face plate and the sleeve are mounted by screws through a cylindrical hole on the work bench so that the upper surface of the face plate is flush with the bench top. The protrusion of the L-shaped clamp beam above the bench top is controlled and locked by a spring-loaded plunger, and a hand knob is mounted to the sleeve under the workbench. According to the design of this prior art, a user has to mount the face plate and the sleeve to both the top and the bottom surfaces of a pre-drilled hole on the workbench. To adjust the clamping gap or to remove the L-shaped clamp beam, the user has to go underneath the workbench to disengage the plunger with the hand knob. When the workpiece and the workbench are relatively large, it would be very inconvenient to do so. Another example, U.S. Pat. No. 2,877,815 Canting Holddown Clamp by W. A. Fonken, has a similar but simpler design as the above-mentioned bench clamp. It has the inconvenience of mounting the bushings to the bottom surface of the workbench but the convenience of adjusting the clamping gap or relocating the L-shaped shank simply from the top of the workbench. Yet another example, U.S. Pat. No. 3,623,718 Clamp Assembly by Eugene J. Thomeczek, Sr., comprises an elongated rack with horizontal slots for the detent of a clamping bar at a desired distance from the bench top. A clamping bolt is fed through the elongated slot of the clamping bar and screwed into the threaded hole on the workbench or through a hole on the bench into the nut underneath to clamp the workpiece. This clamp is very simple in design and easier to use and relocate on a bench top. The only inconvenience is to prepare threaded holes or holes with nuts underneath the bench top for the clamping bolt.

BRIEF SUMMARY OF THE INVENTION

It is the intention of the present invention to provide a clamping device to hold a workpiece tightly, quickly and conveniently anywhere on the working surface of a table, a workbench, or a machine tool regardless of the size of the workpiece and the working surface. Another intention is to enable the present invention to clamp a workpiece anywhere on the working surface without the use of clamping bars, beams or fixtures. Yet another intention of the present invention is to enable the clamping of a workpiece against the working surface without crossing over the edge and reaching the bottom of the work table, workbench or machine tool. It is also the intention of the present invention to lock itself on the working surface by means which can be applied and removed on the top surface only, so there is no need to work underneath the work table, workbench or machine tool. Another intention of the present invention is to make a clamping device, which can be used on various types of working surfaces, such as wood, metal or machine tool, and yet it can be relocated easily over the surface. A further intention of the present invention is to expand the functionality and flexibility of a clamping device by adding a quick release button to the shank, a cylindrical mounting base and a Y-axis attachment.

The present invention comprises a straight shank with the lower end attached to a short cylindrical sleeve and a movable arm sliding over the shank. Feeding through the free end of the movable arm is a threaded rod with a clamping pad at the lower end and a turning handle at the upper end. The clamping pad is designed so that it is free to rotate omni-directionally and free to swivel through a certain angle to meet perfectly with the uneven surface of the workpiece. The turning handle is used to turn the threaded rod downward or upward through the movable arm to clamp or release the workpiece.

To clamp a workpiece on a working surface, the straight shank with the short cylindrical sleeve is attached to the surface and then the movable arm is moved up or down along the shank to a proper location so that the threaded rod can be lowered to clamp the workpiece with the clamping pad. For machine tool applications, the short cylindrical sleeve at the bottom of the shank is inserted into one of the tooling holes on the working surface of the machine tool. If the size of the tooling hole is too big for the cylindrical sleeve, a sleeve of the right size will be used between the and the hole. When pressure is applied to the workpiece through the movable arm and the clamping pad, the shank is tilted a little bit so that the short cylindrical sleeve is skewed against the wall of the tooling hole and the friction created will be sufficient to hold the workpiece against the working surface. For those working surfaces without tooling holes, the short cylindrical sleeve of the straight shank is inserted to the cylindrical mounting base, which is mounted on the working surface with screws. The same method can be used on wooden work tables or workbenchs too. To use the present invention on metal surfaces other than a machine tool, the cylindrical mounting base can also be used as described above. Besides that, a short cylindrical metal tube with an internal diameter a little bit bigger than the external diameter of the short cylindrical sleeve of the shank is spot welded on the metal surface where clamping is required. Then the short cylindrical sleeve of the shank is inserted into the short cylindrical tube and the workpiece can be clamped as mentioned above. To relocate or remove the present invention after the work is finished, the clamping pad is released from the workpiece and hence the friction between the short cylindrical sleeve and the short cylindrical tube is reduced too. Then the present invention can be removed from the working surface. The short cylindrical tube can easily be removed by breaking the spot weld with a hammer, or striking it or prying it with a metal rod. Then the metal surface can be polished to remove the spot weld residue with a suitable power hand tool. Multiple multi-function clamps can be used together at different tooling holes of the said working surface for workpieces of various shapes and sizes.

A Y-axis attachment is devised to enhance the functionality and flexibility of the present invention. It comprises two rectangular metal plates with an elongated hole in the middle, which metal plates are spaced apart by cylindrical blocks at each end. A rectangular block fits inside of, but is free to move between the two metal plates. Two threaded rods are provided. One rod feeds through one of the cylindrical blocks, and the other rod feeds through the other cylindrical block. The rectangular block is equipped with a rectangular hole in the middle. The size of the hole is a bit bigger than the cross-section of the straight shank so that the shank can be fed through it freely. A screw hole is provided on one side of the rectangular block to accept a screw to secure the position of the rectangular block to the shank so that the Y-axis attachment will not move or drop along the shank. The shorter one of the threaded rods in the cylindrical blocks is attached to a clamping pad while the longer one of the threaded rods is equipped with a turning handle. The longer threaded rod is left-hand threaded and the free end of it is pivoted to the rectangular block. Hence turning the longer threaded rod clockwise with the turning handle will advance the Y-axis attachment towards the clamping pad end or the workpiece and turning it counterclockwise will retract the assembly away from the workpiece. With the Y-axis attachment slid over the shank of the present invention, it is possible to clamp a second workpiece along an axis perpendicular to the clamping direction of the first workpiece.

To facilitate the easy insertion and removal of the Y-axis attachment and the movable arm from the straight shank, a quick release button is equipped at the upper end of the shank. It is a metal push button with a loaded compression spring inside. Normally, it prevents the movable arm and the Y-axis attachment from dropping off the shank and when it is pressed, the insertion and removal of these items will be very easy.

DETAILED DESCRIPTION OF THE INVENTION

With the help of the drawings and the detail description below, the features of the present invention will be apparent and fully understandable.

Figure 1:
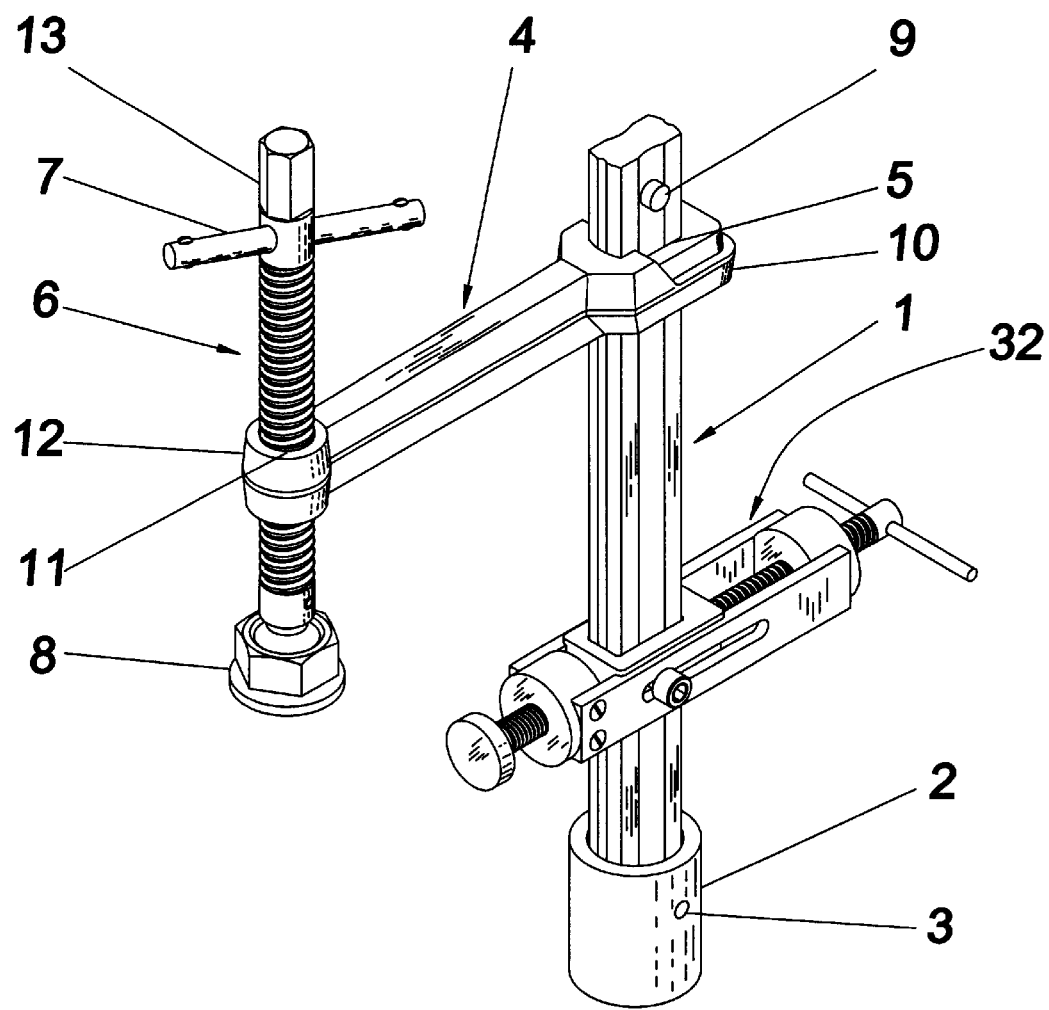
FIG. 1 is a perspective view of the present invention with the Y-axis attachment.

Referring to FIG. 1, the present invention, a multi-function clamp, comprises a straight shank 1, a short cylindrical sleeve 2 attached and fixed to the lower end of shank 1 by taper pin 3, and a movable arm 4 with one end slid over the top end of shank 1 through rectangular hole 5, and the other end fitted with a threaded rod 6, turning handle 7, and the clamping pad 8. The straight shank 1 acts as the fixed arm of a conventional clamp. At the upper end of shank 1, a spring loaded quick release button 9 is equipped to prevent the falling off of the movable arm 4 and other attachments from shank 1, but at the same time it allows quick and easy insertion of these items onto shank 1. Movable arm 4 is a metal bar with a rectangular hole 5 at one end 10 and a cylindrical threaded hole 11 at the other end 12. The upper end of shank 1 is inserted into hole 5 of end 10 so that movable arm 4 is free to move upward and downward on the body of shank 1. The size of hole 5 is just a bit bigger than the cross section of shank 1 so that the movable arm will not be too loose on the body of shank 1. Threaded rod 6 is screwed into threaded hole 11 of end 12 of the movable arm 4. Turning handle 7 is inserted into a hole at the upper end 13 of the threaded rod 6 and a clamping pad 8 is pivoted to the lower end of threaded rod 6. Clamping pad 8 is free to rotate about the tip at the lower end of threaded rod 6 and to swivel through a limited angle in any direction. Upper end 13 of threaded rod 6 is made to be hexagonal with a standard nut size so that a wrench may be used to turn the threaded rod 6 in case a large torque is required to clamp a workpiece.

Figure 2:
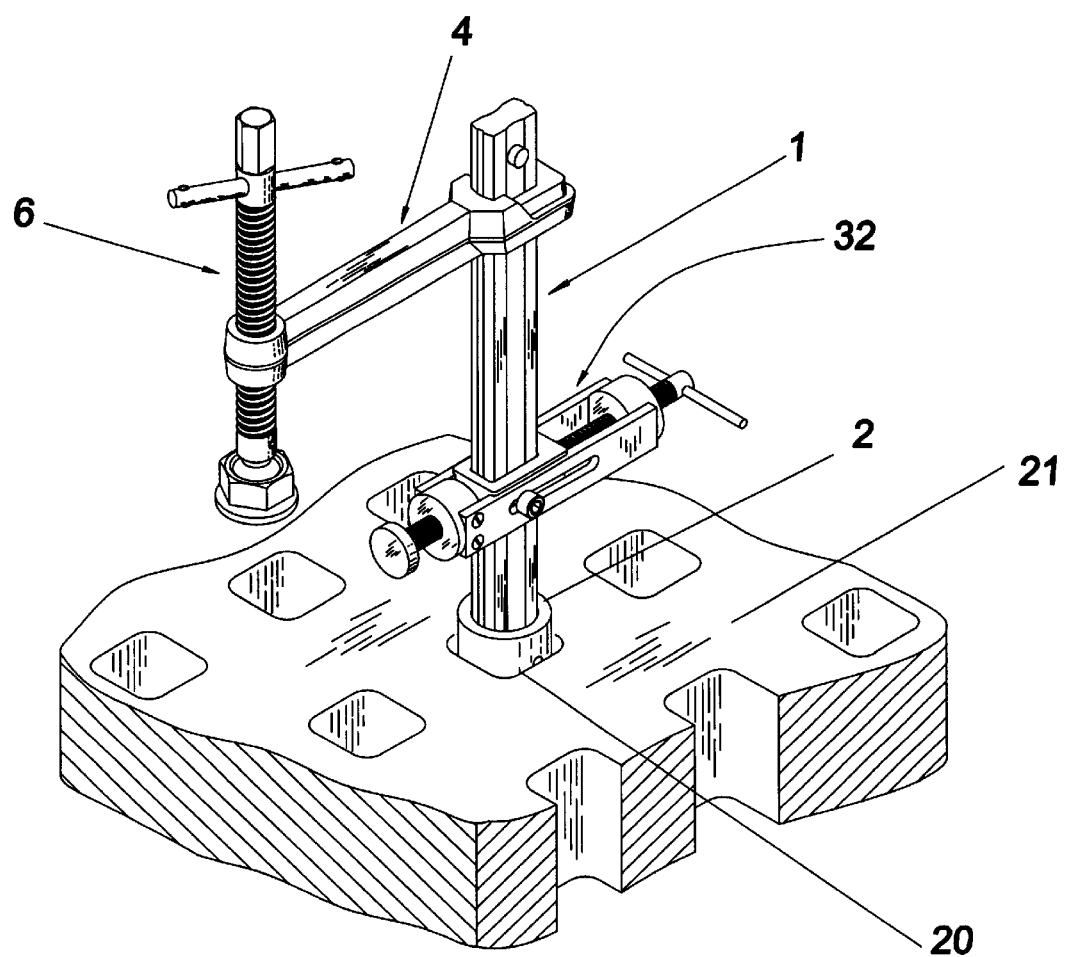
FIG. 2 is a perspective view of the present invention inserted into a tooling hole of the working surface of a machine tool (partly shown).

With reference to FIG. 2 and FIG. 1 as well, to clamp a workpiece on the working surface of a machine tool, the multi-function clamp is inserted with the cylindrical sleeve 2 into one of the tooling holes 20 on the working surface 21 (partly shown). When the threaded rod 6 is turned downwards against the workpiece, the movable arm 4 will be raised so that shank 1 will be skewed a little bit away from the workpiece. Hence cylindrical sleeve 2 will be pressed against one side of the tooling hole 20 and the frictional force generated should be strong enough to clamp the workpiece on the working surface provided that the outside diameter of the cylindrical sleeve 2 is just a bit smaller than the internal size of the tooling hole 20. If the outside diameter of the cylindrical sleeve 2 does not match the size of the tooling hole 20, it should be replaced with another cylindrical sleeve of the right size. The cylindrical sleeve 2 can easily be removed by taking off the taper pin 3. Multiple multi-function clamps can be used at different tooling holes as needed for various shapes and sizes of workpieces.

Figure 3:
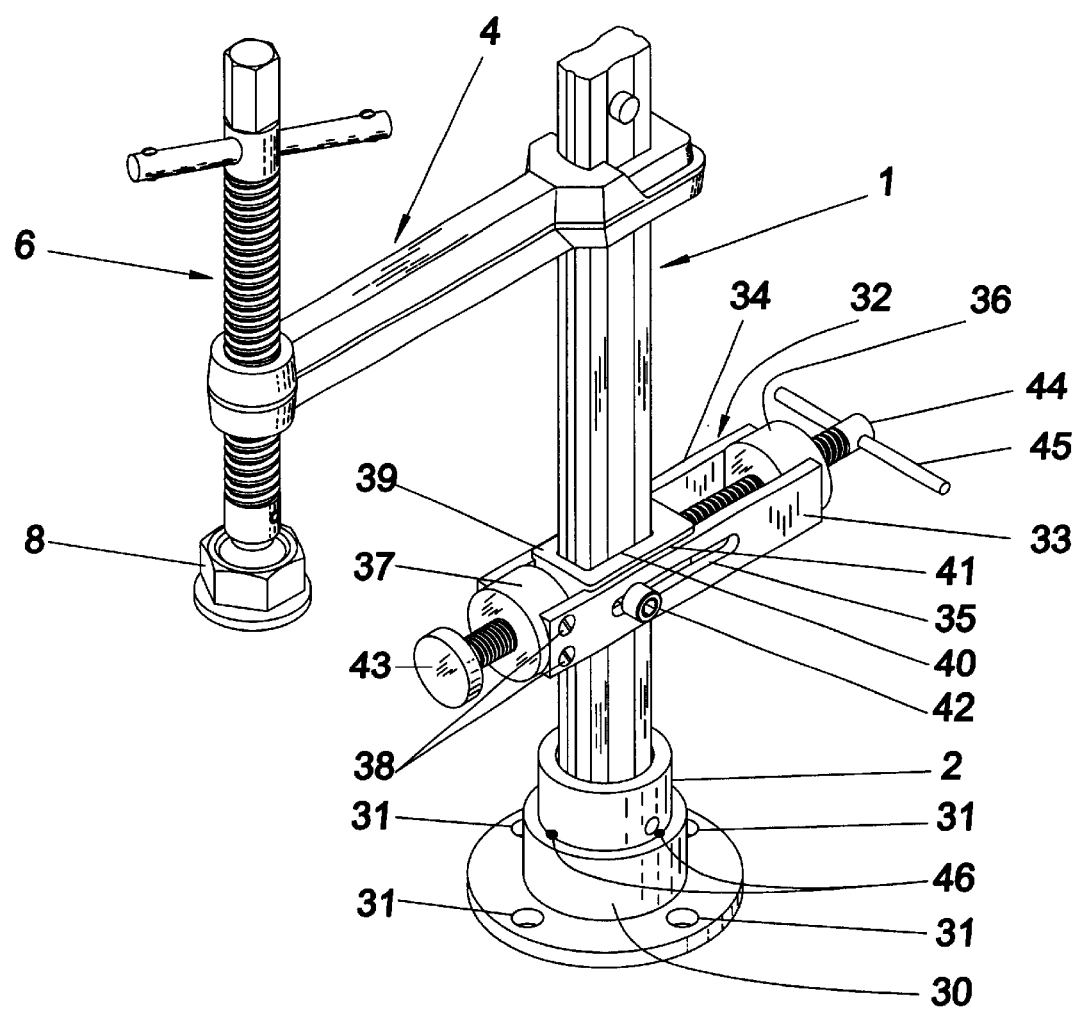
FIG. 3 is a perspective view of the present invention with the cylindrical base unit.

Referring to FIG. 3, to clamp a workpiece on a working surface without tooling holes, the cylindrical mounting base 30 is used. The multi-function clamp is inserted with the attached cylindrical sleeve 2 into the cylindrical mounting base 30, then the outside surface of the cylindrical sleeve 2 is fixed to the upper edge of the mounting base 30 by one or two spot weldings 46. Four screw holes 31 are provided to lock the multi-function clamp assembly by screws to anywhere suitable on the working surface of a table, workbench or machine tool. The same method will apply for wooden working surfaces except that different types of screws will be used.

Again referring to FIG. 3, the function of the multi-function clamp can be expanded by adding the Y-axis attachment 32 onto shank 1. The Y-axis attachment 32 comprises two rectangular metal plates 33 and 34 with an elongated slot 35 in the middle of each plate. The two metal plates 33 and 34 are fixed to and separated by two cylindrical blocks 36 and 37, one at each end of the metal plates. Four screws 38 (only two shown) are used to fix the two metal plates 33 and 34 to the cylindrical block 37. The other end of metal plates 33 and 34 are welded to cylindrical block 36. Enclosed inside the metal plates 33, 34 and the cylindrical blocks 36, 37 is a rectangular block 39 which has a vertical rectangular hole 40 in the middle. The size of hole 40 is just a bit bigger than the cross section of the shank 1 so that shank 1 can be fed through hole 40 and free to slide inside it. On the front and rear sides of the rectangular block 39, four horizontal flanges 41 (only one shown) are provided to accept the two metal plates 33 and 34, one on each side. The distance between the two flanges 41 on the same side of the rectangular block 39 is made to fit the height of the metal plates 33 and 34 so that metal plates 33 and 34 are free to slide over the rectangular block 39 within such two flanges 41. Screw 42 is fed through the elongated slot 35 of metal plate 33 and screwed into a through hole on the front side of the rectangular block 39 so that screw 42 can be used to lock the rectangular block 39 and hence the whole Y-axis attachment in position on shank 1. The design of the screw 42 enables the free sliding of metal plate 33 over rectangular block 39 even when the screw 42 is locking block 39 in fixed position on shank 1. A threaded hole is provided along the center axis of cylindrical block 37 to accept the clamping pad 43. A left-hand threaded hole is provided along the center axis of cylindrical block 36 to feed the left-hand threaded rod 44. One end of the left-hand threaded rod 44 is equipped with a turning handle 45 and the other end of 44 is pivoted to one side of the rectangular block 39. When the left-hand threaded rod 44 is turned clockwise with the handle 45, cylindrical block 36 together with the movable portion of the Y-axis attachment 32 is moved towards the clamping pad 8 on the threaded rod 6, which is mounted on movable arm 4. This mechanism provides some means to clamp a second workpiece vertically with clamping pad 43 of the Y-axis attachment 32 against the first workpiece clamped horizontally under the clamping pad 8 of the threaded rod 6 on movable arm 4.

Figure 4:
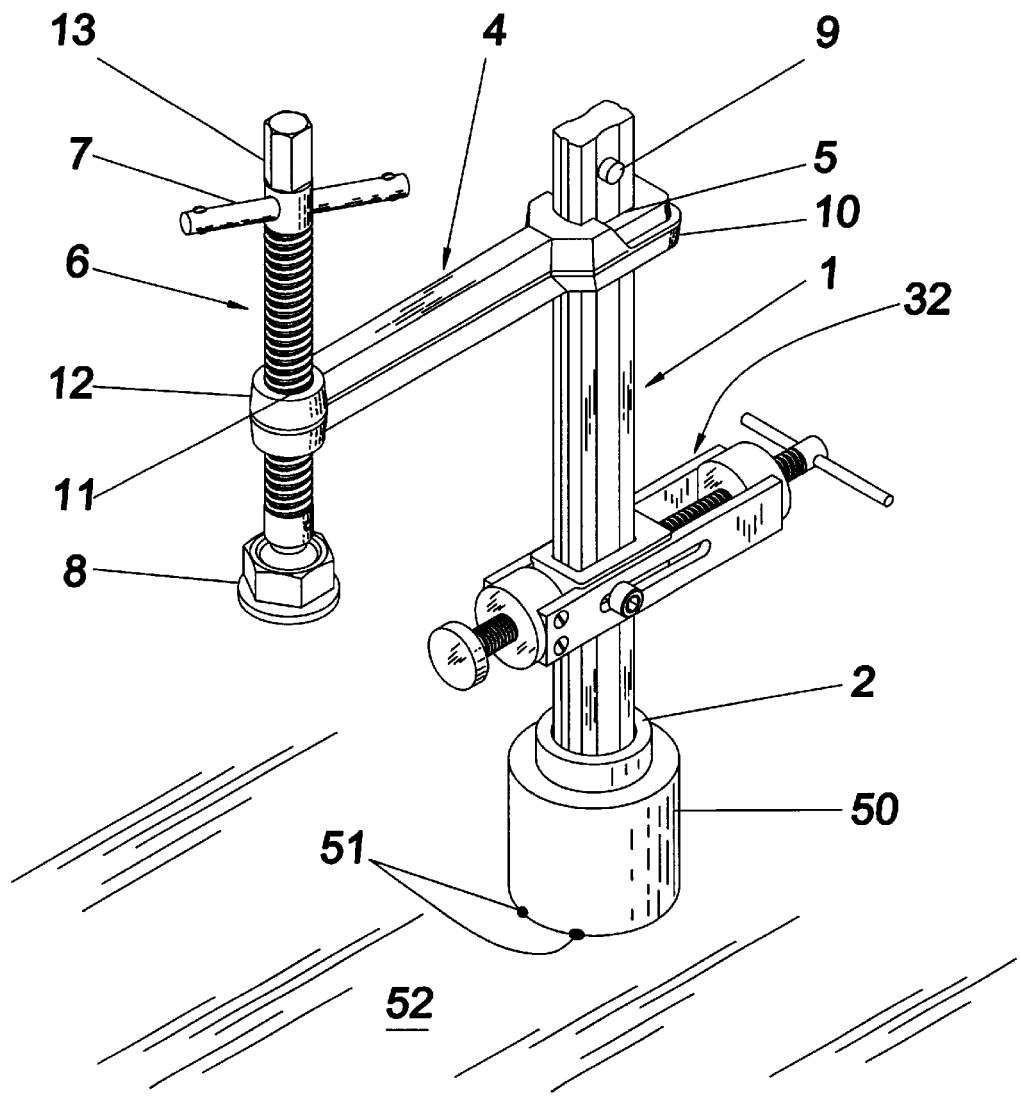
FIG. 4 is a perspective view of the present invention inserted into a short cylindrical tube spot welded on a metal working surface.

When the working surface is metallic without tooling holes and when making screw holes for attaching the cylindrical base 30 is not possible, the multi-function clamp can be used as shown in FIG. 4. A short cylindrical metal tube 50 is spot welded (spot weld 51) on the working surface 52 at the location where clamping is required. Then the multi-function clamp is inserted with the attached cylindrical sleeve 2 into the short cylindrical metal tube 50. When the threaded rod 6 is turned downwards against the workpiece, the movable arm 4 will be raised so that shank 1 will be skewed a little bit away from the workpiece. Hence cylindrical sleeve 2 will be pressed against one side of the internal wall of the short cylindrical metal tube 50 and the frictional force generated should be strong enough to clamp the workpiece on the working surface provided that the outside diameter of the cylindrical sleeve 2 is just a bit smaller than the internal diameter of metal tube 50. If the outside diameter of the cylindrical sleeve 2 does not match the size of metal tube 50, either replace the sleeve 2 or the metal tube 50 with another one of the right size. The sleeve 2 can easily be removed and replaced by taking off the taper pin as described above. The taper pin can be removed with a punch and hammer so that the cylindrical sleeve can be removed and replaced by another cylindrical sleeve of different outside diameter to suit various application needs. Multiple multi-function clamps can be used in different locations as needed for various shape and sizes of workpieces. To relocate or remove the present invention after the work is finished, the clamping pad 8 is released from the workpiece by turning the handle 7 counterclockwise and hence the friction between the cylindrical sleeve 2 and the short cylindrical metal tube 50 is reduced too. Then the multi-function clamp can be removed from the metal tube 50. The short cylindrical metal tube 50 can easily be removed by breaking the spot weld 51 with a hammer, or striking it or prying it with a metal rod. The metal surface 52 can then be polished to remove the spot weld residue 51 with a suitable power hand tool.

What I claim as my invention is:

1. A multi-function clamp for holding a workpiece comprising:
   a generally straight shank element;
   a movable arm member including first and second arm ends, said first arm end being adapted to being slidably mounted on said generally straight shank element;
   a threaded rod member having first and second rod ends, said threaded rod member being adapted to being threadably mounted through said second arm end, said threaded rod element having a clamping pad member pivotally mounted to said second rod end, said clamping pad member being adapted to clampingly engage a workpiece along a first direction responsive to threadable movement of said threaded rod member through said second arm end; and a Y-axis attachment assembly adapted to being slidably mounted on said generally straight shank element, said Y-axis attachment assembly being positionable to hold a second workpiece along a second direction, said second direction being generally perpendicular to said first direction, said Y-axis attachment assembly comprising a block element adapted to slidably receive said generally straight shank element axially therethrough along a first assembly axis, and to slidably support a pair of plate elements on opposed sides thereof for movement along a second assembly axis, said second assembly axis being generally parallel to said second direction, a locking element for securing said block element at a predetermined location along said generally straight shank element, said locking element being adapted to securing said block element at said predetermined location while leaving said pair of plate elements free to move slidably along said second assembly axis.

2. A multi-function clamp according to claim 1, wherein said generally straight shank element includes first and second shank ends, said second shank end being straight; and a cylindrical sleeve adapted to slidably receive said straight second shank end therewithin, said cylindrical sleeve being releasably secured to said straight second shank end.

3. The multi-function clamp according to claim 1 including a mounting base member, said mounting base member being adapted to slidably receiving said cylindrical sleeve therewithin and said mounting base member being adapted to being secured to a working surface.

4. A multi-function clamp according to claim 1, wherein said generally straight shank element includes first and second shank ends, said first shank end being straight and including a spring loaded quick release button, said quick release button being positioned to releasably prevent said movable arm member or said Y-axis attachment assembly from sliding off said first shank end.

5. A Y-axis attachment for a multi-function clamp comprising:

two elongated plate members fixed to one another, spaced apart, and extending generally parallel to one another generally along a Y-axis to define an assembly for said Y-axis attachment;

a shank mounting block element, said assembly being slidably retained on said shank mounting block element for movement generally along said Y-axis, said shank mounting block element having a shank receiving opening extending therethrough generally along a shank axis, said shank axis extending generally perpendicular to said Y-axis, said shank receiving opening being adapted to slidably receiving a shank of a multi-function clamp therethrough;

a locking element adapted to releasably securing said shank mounting block element to said shank without preventing said assembly from sliding relative to said shank mounting block element generally along said Y-axis responsive to the actuation of an assembly actuator, said assembly actuator being adjustably associated with said assembly; and a workpiece engaging element carried by said assembly.

6. A Y-axis attachment of claim 5 wherein each said elongated plate member includes first and second opposed ends, and said assembly includes a first block member positioned generally between about said first opposed ends and spaced from a second block member positioned generally between about said second ends, said shank mounting block element being positioned between said first and second block members.

7. A Y-axis attachment of claim 6 wherein said assembly actuator is threadably mounted to said first block member, and said workpiece engaging element is mounted to said second block member.

8. A Y-axis attachment of claim 5 wherein said locking element is threadably engaged with said shank mounting block element through an elongated slot in one of said elongated plate members.

* * * * *